United States Patent
Kouda

(10) Patent No.: US 10,668,774 B2
(45) Date of Patent: Jun. 2, 2020

(54) PNEUMATIC TIRE

(71) Applicant: The Yokohama Rubber Co., LTD., Minato-ku, Tokyo (JP)

(72) Inventor: Hiraku Kouda, Hiratsuka (JP)

(73) Assignee: The Yokohama Rubber Co., LTD. (JP)

(*) Notice: Subject to any disclaimer, the term of this patent is extended or adjusted under 35 U.S.C. 154(b) by 993 days.

(21) Appl. No.: 14/383,900

(22) PCT Filed: Feb. 22, 2013

(86) PCT No.: PCT/JP2013/054588
§ 371 (c)(1),
(2) Date: Sep. 8, 2014

(87) PCT Pub. No.: WO2013/133049
PCT Pub. Date: Sep. 12, 2013

(65) Prior Publication Data
US 2015/0059940 A1    Mar. 5, 2015

(30) Foreign Application Priority Data

Mar. 9, 2012 (JP) ................................. 2012-053755

(51) Int. Cl.
    *B60C 11/03*      (2006.01)
    *B60C 11/11*      (2006.01)
    *B60C 11/12*      (2006.01)

(52) U.S. Cl.
CPC ...... *B60C 11/0306* (2013.01); *B60C 11/0302* (2013.01); *B60C 11/0304* (2013.01);
(Continued)

(58) Field of Classification Search
CPC . B60C 11/11; B60C 11/0302; B60C 11/0304; B60C 11/0306;
(Continued)

(56) References Cited

U.S. PATENT DOCUMENTS 4,351,381 A * 9/1982 Roberts ............... B60C 11/0306
                                                    152/209.18
5,238,038 A * 8/1993 Glover ..................... B60C 3/04
                                                    152/209.14
(Continued)

FOREIGN PATENT DOCUMENTS

EP          0654365    *   5/1995  ............. B60C 11/11
JP        56095707 A   *   8/1981  ............. B60C 11/04
(Continued)

OTHER PUBLICATIONS

Machine translation of JP03-090404 (no date).*
(Continued)

*Primary Examiner* — Steven D Maki
*Assistant Examiner* — Philip N Schwartz
(74) *Attorney, Agent, or Firm* — Thorpe North & Western

(57) ABSTRACT

A pneumatic tire has a plurality of circumferential main grooves extending in the tire circumferential direction, a plurality of lug grooves extending in the tire width direction, and a plurality of blocks partitioned by the circumferential main grooves and the lug grooves. Also, the block has a bent groove having a bent shape that is convex in one direction and that extends in the tire circumferential direction dividing the block into two in the tire width direction. Also, the blocks that are adjacent to each other in the tire circumferential direction are disposed such that the bend directions of the bent grooves are alternately reversed.

22 Claims, 7 Drawing Sheets

(52) U.S. Cl.
CPC ....... B60C 11/11 (2013.01); *B60C 2011/0339* (2013.01); *B60C 2011/0341* (2013.01); *B60C 2011/0344* (2013.01); *B60C 2011/0346* (2013.01); *B60C 2011/0353* (2013.01); *B60C 2011/0381* (2013.01); *B60C 2011/0383* (2013.01); *B60C 2011/1209* (2013.01)

(58) Field of Classification Search
CPC ..... B60C 2011/0353; B60C 2011/0346; B60C 2011/1209; B60C 2011/0341; B60C 2011/0381; B60C 2011/0339; B60C 2011/0383; B60C 2011/0344
See application file for complete search history.

(56) References Cited

U.S. PATENT DOCUMENTS

| | | | | |
|---|---|---|---|---|
| 5,269,357 | A | * | 12/1993 | Killian ................ B60C 11/0318 152/209.2 |
| 5,435,366 | A | | 7/1995 | Voigt et al. |
| 6,003,575 | A | * | 12/1999 | Koyama ................ B60C 11/12 152/209.18 |
| 8,646,498 | B2 | | 2/2014 | Miyoshi |
| 2004/0020577 | A1 | * | 2/2004 | Hirai ................... B60C 11/0318 152/526 |
| 2008/0047644 | A1 | * | 2/2008 | Yoshikawa ......... B60C 11/0309 152/209.27 |
| 2010/0180997 | A1 | * | 7/2010 | Shimizu .............. B60C 11/0306 152/209.18 |
| 2013/0118662 | A1 | | 5/2013 | Kameda |

FOREIGN PATENT DOCUMENTS

| | | | | |
|---|---|---|---|---|
| JP | 03090404 | A | * 4/1991 | ............. B60C 11/00 |
| JP | H03-0231001 | | 10/1991 | |
| JP | 06143944 | A | * 5/1994 | ............. B60C 11/04 |
| JP | 2764001 | | 10/1994 | |
| JP | H06-278412 | | 10/1994 | |
| JP | 10287110 | A | * 10/1998 | ............. B60C 11/13 |
| JP | 2000-264018 | | 9/2000 | |
| JP | 2007-038924 | | 2/2007 | |
| JP | 2007-182133 | | 7/2007 | |
| JP | 2013-023192 | | 2/2013 | |
| RU | 2011 146 125 | | 5/2013 | |
| RU | 2 489 267 | | 8/2013 | |
| RU | 2 508 995 | | 3/2014 | |
| WO | WO 2011/111319 | | 9/2011 | |

OTHER PUBLICATIONS

Machine translation of JP10-287110 (no date).*
Machine translation of JP56-095707 (no date).*
Machine translation of JP06-143944 (no date).*
International Search Report dated May 28, 2013, 4 pages, Japan.

* cited by examiner

|  | Comparative Example | Working Example 1 | Working Example 2 | Working Example 3 | Working Example 4 | Working Example 5 | Working Example 6 | Working Example 7 | Working Example 8 |
|---|---|---|---|---|---|---|---|---|---|
| Bent groove and notch | None | Yes | Yes | Yes | Yes | Yes | Yes | Yes | Yes |
| G2/G1 | - | 0.14 | 0.85 | 0.43 | 0.43 | 0.43 | 0.43 | 0.43 | 0.43 |
| G2/G1 | - | 0.67 | 0.67 | 0.22 | 0.89 | 0.67 | 0.67 | 0.67 | 0.67 |
| αa [deg] | - | 120 | 120 | 120 | 120 | 80 | 160 | 120 | 125 |
| αb [deg] | - | 120 | 120 | 120 | 120 | 80 | 160 | 100 | 90 |
| |αa-αb| [deg] | - | 0 | 0 | 0 | 0 | 0 | 0 | 20 | 35 |
| G2/G1 | - | 0.43 | 0.43 | 0.43 | 0.43 | 0.43 | 0.43 | 0.43 | 0.43 |
| G2/G1 | - | 0.33 | 0.33 | 0.33 | 0.33 | 0.33 | 0.33 | 0.33 | 0.33 |
| βa [deg] | - | 65 | 65 | 65 | 65 | 65 | 65 | 65 | 65 |
| βb [deg] | - | 65 | 65 | 65 | 65 | 65 | 65 | 65 | 65 |
| |βa-βb| [deg] | - | 0 | 0 | 0 | 0 | 0 | 0 | 0 | 0 |
| D1, D2 | - | T1<T2 | T1<T2 | T1<T2 | T1<T2 | T1<T2 | T1<T2 | T1<T2 | T1<T2 |
| Snow performance | 100 | 103 | 107 | 103 | 107 | 108 | 103 | 108 | 108 |
| Wet performance | 100 | 103 | 103 | 103 | 103 | 103 | 108 | 106 | 103 |
| Steering stability performance | 100 | 99 | 97 | 99 | 97 | 99 | 97 | 100 | 98 |

FIG. 6A

| | Working Example 9 | Working Example 10 | Working Example 11 | Working Example 12 | Working Example 13 | Working Example 14 | Working Example 15 | Working Example 16 |
|---|---|---|---|---|---|---|---|---|
| Bent groove and notch | Yes | Yes | Yes | Yes | Yes | Yes | Yes | Yes |
| G2/G1 | 0.43 | 0.43 | 0.43 | 0.43 | 0.43 | 0.43 | 0.43 | 0.43 |
| G2/G1 | 0.67 | 0.67 | 0.67 | 0.67 | 0.67 | 0.67 | 0.67 | 0.67 |
| αa [deg] | 120 | 120 | 120 | 120 | 120 | 120 | 120 | 120 |
| αb [deg] | 120 | 120 | 120 | 120 | 120 | 120 | 120 | 120 |
| \|αa−αb\| [deg] | 0 | 0 | 0 | 0 | 0 | 0 | 0 | 0 |
| G2/G1 | 0.14 | 0.85 | 0.43 | 0.43 | 0.43 | 0.43 | 0.43 | 0.43 |
| G2/G1 | 0.33 | 0.33 | 0.06 | 0.78 | 0.33 | 0.33 | 0.33 | 0.33 |
| βa [deg] | 65 | 65 | 65 | 65 | 65 | 65 | 65 | 65 |
| βb [deg] | 65 | 65 | 65 | 65 | 80 | 70 | 65 | 65 |
| \|βa−βb\| [deg] | 0 | 0 | 0 | 0 | 15 | 5 | 0 | 0 |
| D1, D2 | T1<T2 | T1<T2 | T1<T2 | T1<T2 | T1<T2 | T1<T2 | T1<T2 | T1<T2 |
| Snow performance | 103 | 107 | 103 | 107 | 107 | 107 | 107 | 107 |
| Wet performance | 103 | 103 | 103 | 103 | 107 | 107 | 105 | 107 |
| Steering stability performance | 99 | 97 | 99 | 97 | 98 | 98 | 98 | 98 |

FIG. 6B

PNEUMATIC TIRE

TECHNICAL FIELD

The present technology relates to a pneumatic tire, and more particularly relates to a pneumatic tire that can improve the snow performance and the wet performance.

BACKGROUND

In recent years, there is a demand for high wet performance in addition to snow performance for winter tires for passenger cars. The technologies described in Japanese Patent No. 2764001 and Japanese Unexamined Patent Application Publication No. 2000-264018A are known conventional winter tires for passenger cars.

SUMMARY

The present technology provides a pneumatic tire whereby snow performance and wet performance can be enhanced.

The pneumatic tire according to this technology includes a plurality of circumferential main grooves that extend in the tire circumferential direction; a plurality of lug grooves that extend in the tire width direction; and a plurality of blocks partitioned by the circumferential main grooves and the lug grooves, wherein the blocks include a bent groove having a bent shape that is convex in one direction and that extends in the tire circumferential direction dividing the block into two in the tire width direction, and the blocks that are adjacent to each other in the tire circumferential direction are disposed such that the bend direction of the bent grooves are alternately reversed.

Also, the pneumatic tire according to this technology includes two circumferential main grooves that extend in the tire circumferential direction; a single row of a center land portion and a pair of left and right shoulder land portions partitioned by the circumferential main grooves; and a plurality of lug grooves disposed in the center land portion, wherein the lug grooves are inclined lug grooves that incline and extend at a predetermined inclination angle with respect to the tire circumferential direction, a first end portion thereof opens into the circumferential main groove, and a second end portion thereof terminates within the center land portion, the center land portion is divided into a plurality of blocks by intersecting the lug groove that extends from one of the circumferential main grooves and the lug groove that extends from the other of the circumferential main grooves within the center land portion, the blocks include a bent groove having a bent shape that is convex in one direction and that extends in the tire circumferential direction dividing the block into two in the tire width direction, and the blocks that are adjacent to each other in the tire circumferential direction are disposed such that the bend direction of the bent grooves are alternately reversed.

In the pneumatic tire according to this technology, the blocks are provided with the bent grooves that are convex in the tire width direction, so the edge component of the blocks is increased, and this has the advantage that the snow performance of the tire is improved. Also, the groove area of the land portions is increased by the bent grooves, and, the water drainage properties of the land portions are improved by extending the bent grooves in the tire circumferential direction, and this has the advantage that the tire wet performance is improved.

BRIEF DESCRIPTION OF THE DRAWINGS

FIGS. 6A-6B include a table showing results of performance testing of pneumatic tires according to embodiments of the present technology.

DETAILED DESCRIPTION

The present technology is described below in detail with reference to the accompanying drawings. However, the present technology is not limited to these embodiments. Moreover, constituents which can possibly or obviously be substituted while maintaining consistency with the present technology are included in constitutions of the embodiments. Furthermore, the multiple modified examples described in the embodiment can be combined as desired within the scope apparent to a person skilled in the art.

Pneumatic Tire

Figure 1:
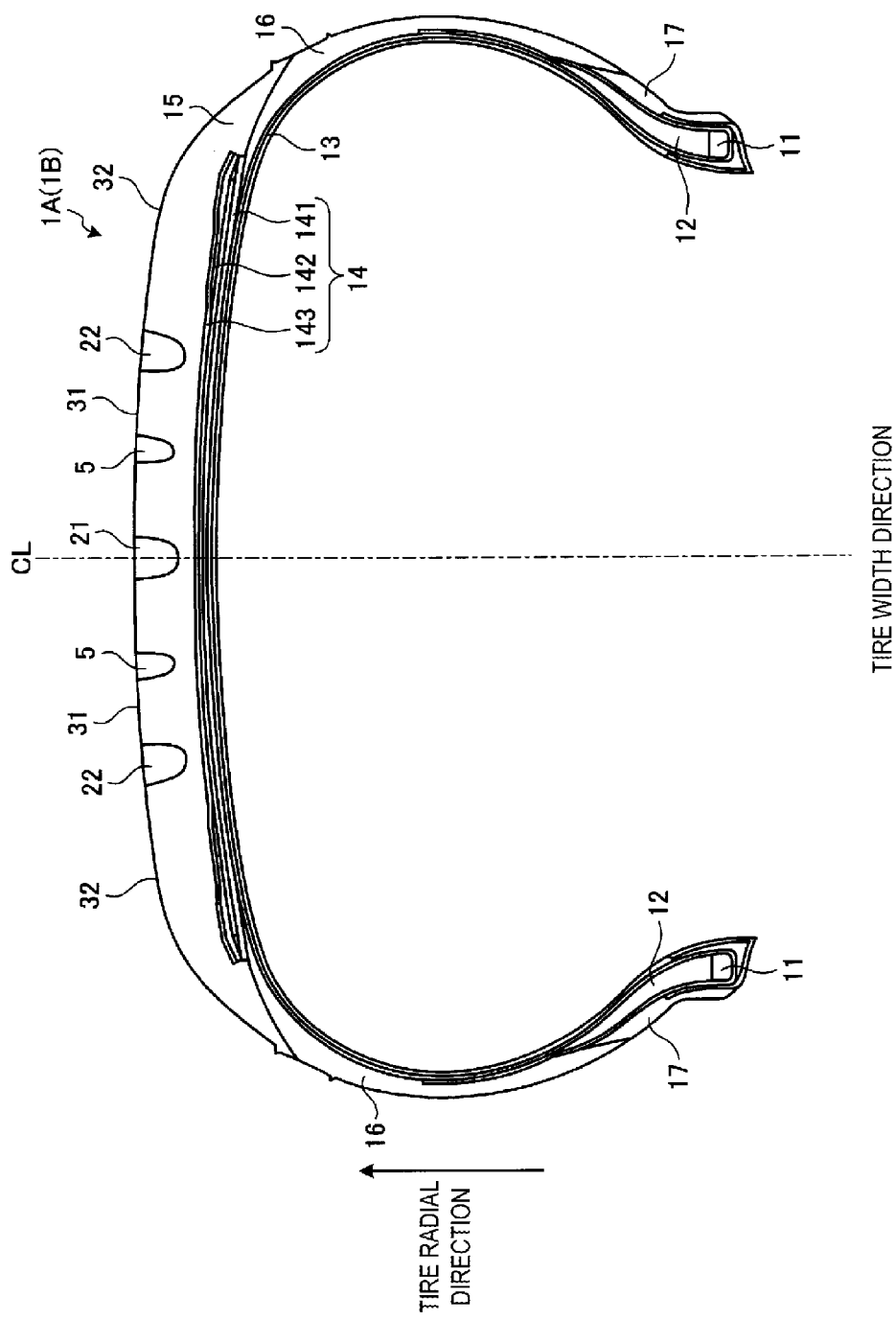
FIG. 1 is a cross-sectional view in a tire meridian direction illustrating a pneumatic tire according to an embodiment of the present technology.

FIG. 1 is a cross-sectional view in a tire meridian direction illustrating a pneumatic tire 1A (1B) according to an embodiment of the present technology. This drawing illustrates a radial tire for use on a passenger car as an example of the pneumatic tire 1A. Note that the symbol CL refers to a tire equator plane.

The pneumatic tire 1A includes a pair of bead cores 11, 11, a pair of bead fillers 12, 12, a carcass layer 13, a belt layer 14, tread rubber 15, a pair of side wall rubbers 16,16, and a pair of rim cushion rubbers 17,17 (see FIG. 1).

The pair of bead cores 11, 11 have annular structures and constitute cores of left and right bead portions. The pair of bead fillers 12, 12 is disposed on a periphery of each of the pair of bead cores 11, 11 in the tire radial direction so as to reinforce the bead portions.

The carcass layer 13 has a single-layer structure, and stretches between the left and right bead cores 11, 11 in toroidal form, forming a framework for the tire. Additionally, both ends of the carcass layer 13 are folded toward an outer side in the tire width direction so as to envelop the bead cores 11 and the bead fillers 12, and fixed. Also, the carcass layer 13 is constituted by a plurality of carcass cords formed from steel or organic fibers (e.g. aramid, nylon, polyester, rayon, or the like) covered by a coating rubber and subjected to a rolling process, and has a carcass angle (inclination angle of the carcass cord in the fiber direction with respect to the tire circumferential direction), as an absolute value, of not less than 85 degrees and not more than 95 degrees.

The belt layer 14 is formed by laminating a pair of cross belts 141, 142, and a belt cover 143, disposed on the periphery of the carcass layer 13. The pair of cross belts 141, 142 are constituted by a plurality of belt cords formed from steel or organic fibers, covered by coating rubber, and subjected to a rolling process, having a belt angle, as an absolute value, of not less than 10 degrees and not more than 30 degrees. Further, each of the belts of the pair of cross belts 141, 142 has a belt angle (inclination angle in the fiber direction of the belt cord with respect to the tire circumferential direction) denoted with a mutually different symbol, and the belts are stacked so as to intersect each other in the belt cord fiber directions (crossply configuration). The belt cover 143 is configured by a plurality of belt cords formed from steel or organic fibers, covered by coating rubber, and subjected to a rolling process, having a belt angle, as an absolute value, of not less than 10 degrees and not more than 45 degrees. Also, the belt cover 143 is disposed so as to be laminated on the outer side in the tire radial direction of the cross belts 141, 142.

The tread rubber 15 is disposed on an outer circumference in the tire radial direction of the carcass layer 13 and the belt layer 14, and forms a tread portion of the tire. The pair of side wall rubbers 16, 16 is disposed on each outer side of the carcass layer 13 in the tire width direction, so as to form left and right sidewall portions of the tire. The pair rim cushion rubbers 17 and 17 is disposed on each outer side of the left and right bead cores 11, 11 and the bead fillers 12, 12 in the tire width direction so as to form left and right bead portions of the tire.

Figure 2:
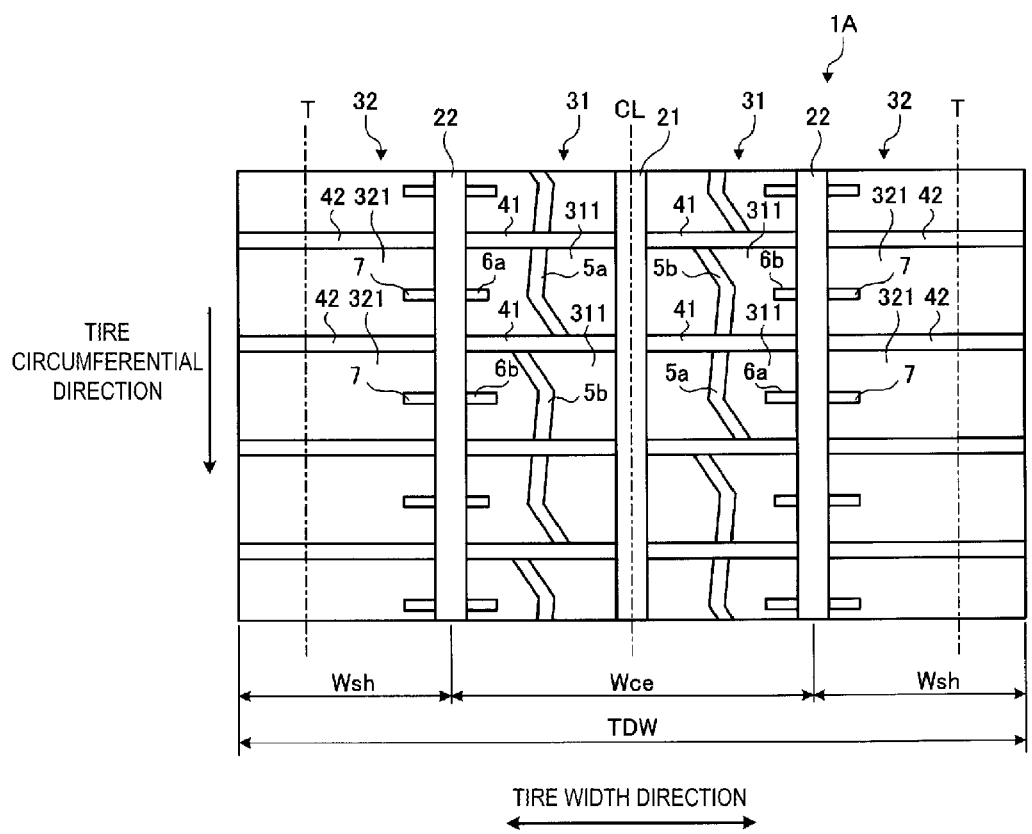
FIG. 2 is a plan view illustrating a tread surface of the pneumatic tire depicted in FIG. 1.

FIG. 2 is a plan view illustrating a tread surface of the pneumatic tire 1A depicted in FIG. 1. This drawing illustrates a typical block pattern. The symbol T is the tire ground contact edge.

The pneumatic tire 1A includes a plurality of circumferential main grooves 21, 22 extending in the tire circumferential direction, a plurality of land portions 31, 32 partitioned by the circumferential main grooves 21, 22, and a plurality of lug grooves 41, 42 extending in the tire width direction. In addition, the pneumatic tire 1A includes a plurality of blocks 311, 321 partitioned by the circumferential main grooves 21, 22 and the lug grooves 41, 42.

Circumferential main groove refers to a circumferential groove having a groove width W1 of not less than 3.0 mm. Moreover, lug groove refers to a lateral groove having a groove width of not less than 2.0 mm. When measuring these groove widths, notch grooves and the chamfered portion formed in the groove opening portion are omitted.

For example, in the configuration in FIG. 2, the three circumferential main grooves 21, 22 have a straight shape, disposed with left-right symmetry about the tire equatorial plane CL as center. Moreover, two rows of center land portions 31, 31 and a pair of left and right shoulder land portions 32, 32 are partitioned by these circumferential main grooves 21, 22. Additionally, each of the land portions 31, 32 has a plurality of lug grooves 41, 42, respectively. Also, each of the lug grooves 41, 42 has an open structure that crosses the land portions 31, 32, and is disposed at predetermined intervals in the tire circumferential direction. In this way, each of the land portions 31, 32 is partitioned into the plurality of blocks 311, 321 having a rectangular shape.

In the configuration in FIG. 2, each of the land portions 31, 32 is a row of blocks formed from the plurality of blocks 311, 321. However, this is not a limitation, and at least one land portion may be a row of blocks. For example, in the configuration in FIG. 2, the center land portions 31, 31 are rows of blocks, and the left and right shoulder land portions 32, 32 may be ribs (not illustrated on the drawings). Specifically, the lug groove 42 of the shoulder land portion 32 can be envisaged to be configured with a semi-closed structure that terminates within the shoulder land portion 32.

Also, in the configuration in FIG. 2, preferably the developed tread width TDW and the distance Wce between the left and right outermost circumferential main grooves 22, 22 are within the range $0.3 \leq Wcs/TDW \leq 0.7$. In the configuration in FIG. 2, as described above, the left and right outermost circumferential main grooves 22, 22 are disposed with left-right symmetry about the tire equatorial plane CL as center, so the distances Wsh, Wsh on the left and right from the outermost circumferential main grooves 22, 22 to the end of the tread are equal.

The developed tread width TDW refers to the straight line distance between the two ends of the tread pattern portion of the tire on a developed view when the tire is assembled on a regular rim and the regular inner pressure is applied under no load conditions.

Herein, "standard rim" refers to an "applicable rim" defined by the Japan Automobile Tyre Manufacturers Association (JATMA), a "design rim" defined by the Tire and Rim Association (TRA), or a "measuring rim" defined by the European Tyre and Rim Technical Organisation (ETRTO). "Regular inner pressure" refers to "maximum air pressure" stipulated by JATMA, a maximum value in "tire load limits at various cold inflation pressures" defined by TRA, and "inflation pressures" stipulated by ETRTO. Note that "regular load" refers to "maximum load capacity" stipulated by JATMA, a maximum value in "tire load limits at various cold inflation pressures" defined by TRA, and "load capacity" stipulated by ETRTO. However, with JATMA, in the case of passenger car tires, the regular internal pressure is an air pressure of 180 kPa, and the regular load is 88% of the maximum load capacity.

Block Bent Grooves

Figure 3:
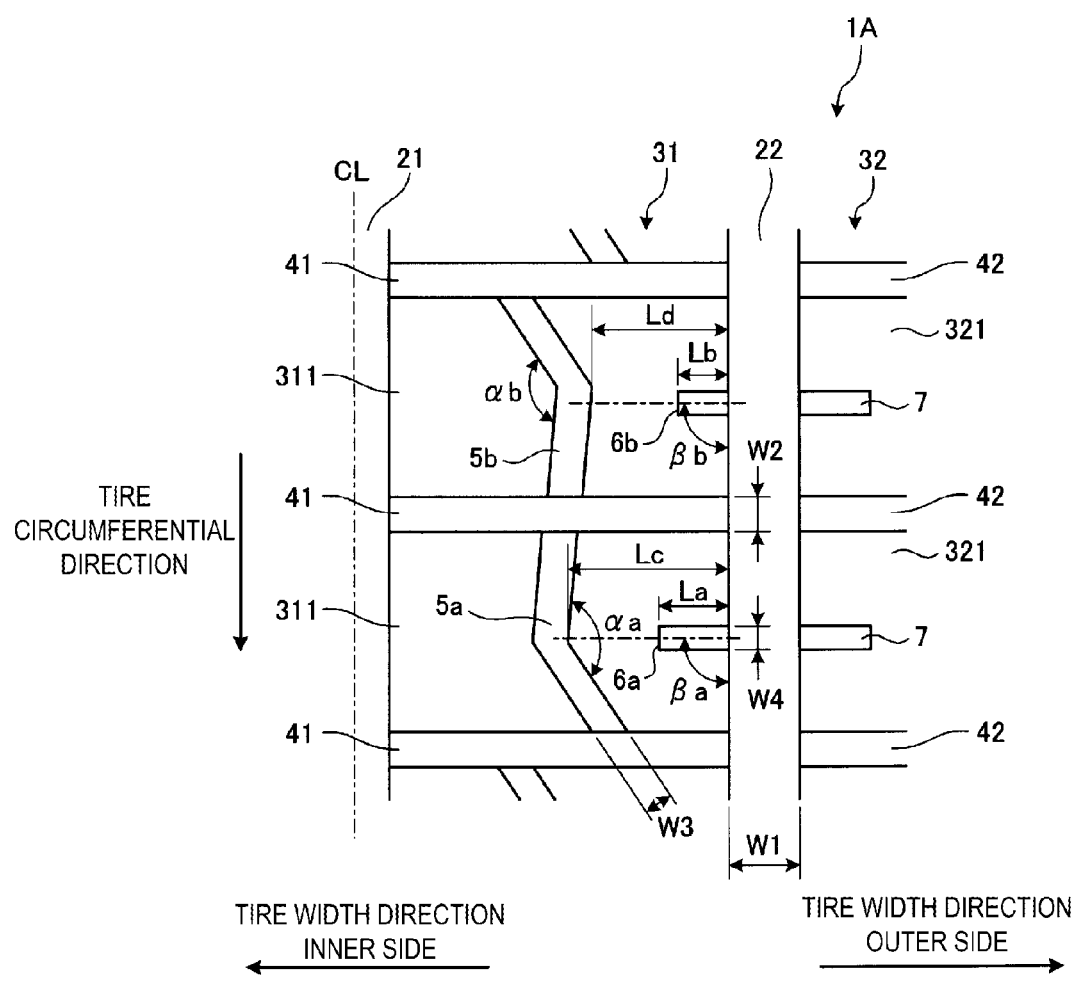
FIG. 3 is an enlarged view illustrating the main portion of the pneumatic tire depicted in FIG. 2.

FIG. 3 is an enlarged view illustrating the main portion of the pneumatic tire 1A depicted in FIG. 2. This drawing illustrates a row of blocks of the center land portion 31.

In the pneumatic tire 1A, the blocks 311 of the center land portion 31 have bent grooves 5a, 5b (see FIG. 2 and FIG. 3). The bent grooves 5a, 5b have a bent shape that is convex in one direction in the tire width direction, and extend in the tire circumferential direction dividing the block 311 into two in the tire width direction. Also, blocks 311 that are adjacent to each other in the tire circumferential direction are disposed such that the bend directions of the bent grooves 5a, 5b are alternately reversed. Bent grooves 5a, 5b refers to grooves having a refracted shape or a curved shape, and includes, for example, grooves with a V-shape, a U-shape, an arc-shape, or the like.

For example, in the configuration in FIG. 2 and FIG. 3, each block 311 of the left and right center land portion 31, 31 has the bent groove 5a, or 5b. Also, one of the bent grooves 5a, 5b is disposed in one block 311. Also, the bent grooves 5a, 5b have a V-shape that is convex in only one direction in the tire width direction, and both edges are open in the edge portions of the block 311 in the tire circumferential direction. Also, the blocks 311 are divided into left and right small block portions by the bent grooves 5a, 5b.

In the pneumatic tire 1A, the blocks 311 are provided with the bent grooves 5a, 5b that are convex in the tire width direction, so the edge component of the blocks 311 is increased, and the snow performance of the tire is improved. Also, the groove area of the land portions 31 is increased by the bent grooves 5a, 5b, and, the drainage properties of the land portions 31 are improved by extending the bent grooves 5a, 5b in the tire circumferential direction, so the tire wet performance is improved. Also, the blocks 311, 311 that are adjacent to each other in the tire circumferential direction are disposed such that the bend directions of the bent grooves 5a, 5b are alternately reversed, so collapse of the blocks 311 in the tire width direction is suppressed, and the steering stability performance of the tire is ensured.

In the configuration in FIG. 2 and FIG. 3, the left and right center land portions 31 only have the bent grooves 5a, 5b. However, this is not a limitation, and the left and right shoulder land portions 32, 32 may also have the bent grooves 5a, 5b (not illustrated on the drawings). Also, in a configuration in which the pneumatic tire 1A has three or more rows of center land portions and left and right shoulder land portions (not illustrated on the drawings), at least one row of center land portions may have the bent grooves 5a, 5b.

Also, preferably the groove width W1 of the circumferential main groove 22 and the groove width W3 of the bent grooves 5a, 5b have the relationship 0.2≤W3/W1≤0.8, and more preferably have the relationship 0.3≤W3/W1≤0.6 (see FIG. 3). The groove width W1 of the circumferential main groove 22 is measured as the groove width of the circumferential main groove 22 that partitions the edge portion on the outer side in the tire width direction of the blocks 311 having the bent grooves 5a, 5b (in FIG. 2, the outermost circumferential main groove 22). Also, the groove width W3 of the bent grooves 5a, 5b are measured as the groove width of the linear section, as illustrated in FIG. 3.

Also, preferably the groove depth H1 of the circumferential main grooves 22 (not illustrated on the drawings) and the groove depth H3 of the bent grooves 5a, 5b (not illustrated on the drawings) have the relationship 0.3≤H3/H1≤0.8, and more preferably have the relationship 0.4≤H3/H1≤0.6. The groove depth H1 of the circumferential main groove 22 is measured as the groove depth of the circumferential main groove 22 that partitions the edge portion on the outer side in the tire width direction of the blocks 311 having the bent grooves 5a, 5b. Also, the groove depth H1 of the circumferential main grooves 22 and the groove depth H3 of the bent grooves 5a, 5b are measured as the maximum groove depth, excluding raised bottom portions of the groove bottoms, and the like.

Also, preferably the bend angles αa, αb of the bent grooves 5a, 5b are within the range 90 degrees≤αa≤150 degrees, and 90 degrees≤αb≤150 degrees, and more preferably within the range 100 degrees≤αa≤130 degrees, and 100 degrees≤αb≤130 degrees (see FIG. 3). Also, preferably the bend angles αa, αb of the bent grooves 5a, 5b of blocks 311, 311 that are adjacent to each other in the tire circumferential direction have the relationship 10 degrees≤|αa−αb|≤30 degrees. In the configuration of the bent shapes of the bent grooves 5a, 5b, the angle formed between the lines joining the center point of the curved portion and the two openings of the bent grooves 5a, 5b constitutes the bend angles αa, αb of the bent grooves 5a, 5b.

Also, the bent portion of the bent grooves 5a, 5b is disposed in the center region when the block 311 is divided into three equal portions in the tire circumferential direction (see FIG. 3). For example, in the configuration in FIG. 2 and FIG. 3, the bent grooves 5a, 5b have bent portions in the center portion (⅓rd region) in the tire circumferential direction, and linear sections in the two end portions (the other ⅔rd regions). In a configuration in which the bent grooves 5a, 5b have a curved shape (not illustrated on the drawings), the center point of the curved portion constitutes the bent portion of the bent grooves 5a, 5b.

Also, the openings of the bent groove 5a (5b) are disposed offset with respect to the openings of the bent grooves 5a, 5b of at least one of the blocks 311 that are adjacent in the tire circumferential direction (see FIG. 2). Therefore, in adjacent blocks 311 in the tire circumferential direction, the bent grooves 5a, 5b of each of the blocks 311 are disposed mutually separated (are not continuous in the tire circumferential direction) at least one opening.

For example, in the configuration in FIG. 2 and FIG. 3, one of the openings of one of the bent grooves 5a (5b) is disposed opposite the opening of the bent groove 5b (5a) of one of the adjacent blocks 311 in the tire circumferential direction, and, the other opening is disposed offset with respect to the opening of the bent groove 5b (5a) of the other adjacent block 311 in the tire circumferential direction. Therefore, a pair of bent grooves 5a, 5b that are adjacent to each other in the tire circumferential direction is disposed continuous by having the openings opposite each other. Also, if one set is a pair of such bent grooves 5a, 5b, a plurality of sets of bent grooves 5a, 5b is disposed discontinuously by offsetting the openings from each other.

Also, in the configuration in FIG. 2 and FIG. 3, one block 311 has a single bent groove 5a (5b). However, this is not a limitation, and a single block 311 may have a plurality of bent grooves 5a, 5b (not illustrated on the drawings).

Block Notch Grooves

Also, in the pneumatic tire 1A, the blocks 311 with the bent grooves 5a, 5b are provided with notch grooves 6a, 6b (see FIG. 2 and FIG. 3). The notch grooves 6a, 6b open into the edge portion of the block 311 in the tire width direction at a first end portion thereof, and a second end portion thereof terminate within the block 311 without intersecting the bent grooves 5a, 5b.

For example, in the configuration in FIG. 2 and FIG. 3, the blocks 311 in the center land portion 31 each have one bent groove 5a (5b) and one notch groove 6a (6b). Also, the notch grooves 6a, 6b have a linear form, extending from the edge portion on the outer side of the block 311 in the tire width direction toward the tire equatorial plane CL, and terminating before the bent grooves 5a, 5b. The blocks 321 on the shoulder land portions 32 also have notch grooves 7 in the edge portions on the inner side in the tire width direction.

In the pneumatic tire 1A, by providing the blocks 311 with the notch grooves 6a, 6b, the edge component of the blocks 311 is increased, and the snow performance of the tire is improved. Also, because the notch grooves 6a, 6b and the bent grooves 5a, 5b do not intersect, the stiffness of the blocks 311 is properly ensured, and the tire steering stability performance is ensured.

In the configuration in FIG. 2 and FIG. 3, as described above, the notch grooves 6a, 6b are disposed in the edge portions on the outer side in the tire width direction of the blocks 311. However, this is not a limitation, and the notch grooves 6a, 6b may be disposed in the edge portions on the inner side in the tire width direction of the blocks 311 (not illustrated on the drawings), and they may be disposed in the edge portions both on the outer side in the tire width direction and the inner side in the tire width direction of the blocks 311 (not illustrated on the drawings).

Also, the groove length Lb of the notch groove 6b on the bend side of the bent groove 5b and the groove length La of the notch groove 6a on the opposite side to the bend side of the bent groove 5a have the relationship La>Lb. Therefore, the groove lengths La, Lb of the notch grooves 6a, 6b are adjusted in accordance with their positional relationship to the bent grooves 5a, 5b. The groove length of the notch grooves refers to the groove length from the openings of the notch grooves 6a, 6b in the edge portions of the blocks 311 to the terminating portion of the notch grooves 6a, 6b within the blocks 311.

For example, in the configuration in FIG. 3, as described above, the notch grooves 6a, 6b are disposed in the edge portions on the outer side in the tire width direction of the blocks 311. In this case, the notch groove 6b having a short groove length Lb is disposed with the bent groove 5b that is convex to the outer side in the tire width direction, and the notch groove 6a having a long groove length La is disposed with the bent groove 5a that is convex to the inner side in the tire width direction. In this way, the stiffness of the portion of the blocks 311 having the notch grooves 6a, 6b is uniform.

Also, preferably the groove width W1 of the circumferential main groove 22 and the groove width W4 of the notch grooves 6a, 6b have the relationship $0.2 \leq W4/W1 \leq 0.8$, and more preferably have the relationship $0.3 \leq W4/W1 \leq 0.6$ (see FIG. 3). In addition, by providing the relationship $0.5 \leq W4/W3 \leq 1.0$ between the groove width W3 of the bent grooves 5a, 5b and the groove width W4 of the notch grooves 6a, 6b, the stiffness as a block pattern is properly ensured.

Also, preferably the groove depth H1 of the circumferential main grooves 22 and the groove depth H4 of the notch grooves 6a, 6b (not illustrated on the drawings) have the relationship $0.1 \leq H4/H1 \leq 0.6$, and more preferably have the relationship $0.2 \leq H4/H1 \leq 0.4$. The groove depth H4 of the notch grooves 6a, 6b is measured as the maximum groove depth, excluding raised bottom portions of the groove bottoms, and the like.

Also, the notch grooves 6a, 6b are disposed in the center region when the block 311 is divided into three equal portions in the tire circumferential direction (see FIG. 3). For example, in the configuration in FIG. 3, both the bent portion of the bent groove 5a (5b) and the notch groove 6a (6b) are disposed in the center portion in the tire circumferential direction of the block 311.

Also, the point of intersection of the imaginary line extending from the notch groove 6a having the groove length La and the bent groove 5a is obtained. In this case, the distance Lc between this intersection point and the opening in the edge portion of the block 311 of the notch groove 6a is within the range $0.2 \leq La/Lc \leq 0.6$. Likewise, the point of intersection of the imaginary line extending from the notch groove 6b having the groove length Lb and the bent groove 5b is obtained. In this case, the distance Ld between this intersection point and the opening in the edge portion of the block 311 of the notch groove 6b is within the range $0.2 \leq Lb/Ld \leq 0.6$. Also, the ratio La/Lc and the ratio Lb/Ld have the relationship $0.90 \leq (La/Lc)/(Lb/Ld) \leq 1.10$.

Also, preferably the inclination angles βa, βb with respect to the tire circumferential direction of the notch grooves 6a, 6b in a pair of blocks 311, 311 that are adjacent to each other in the tire circumferential direction are within the range $|\beta a - \beta b| \leq 10$ degrees (see FIG. 3). In other words, preferably each of the notch grooves 6a, 6b are disposed substantially parallel.

Modified Examples

Figure 4:
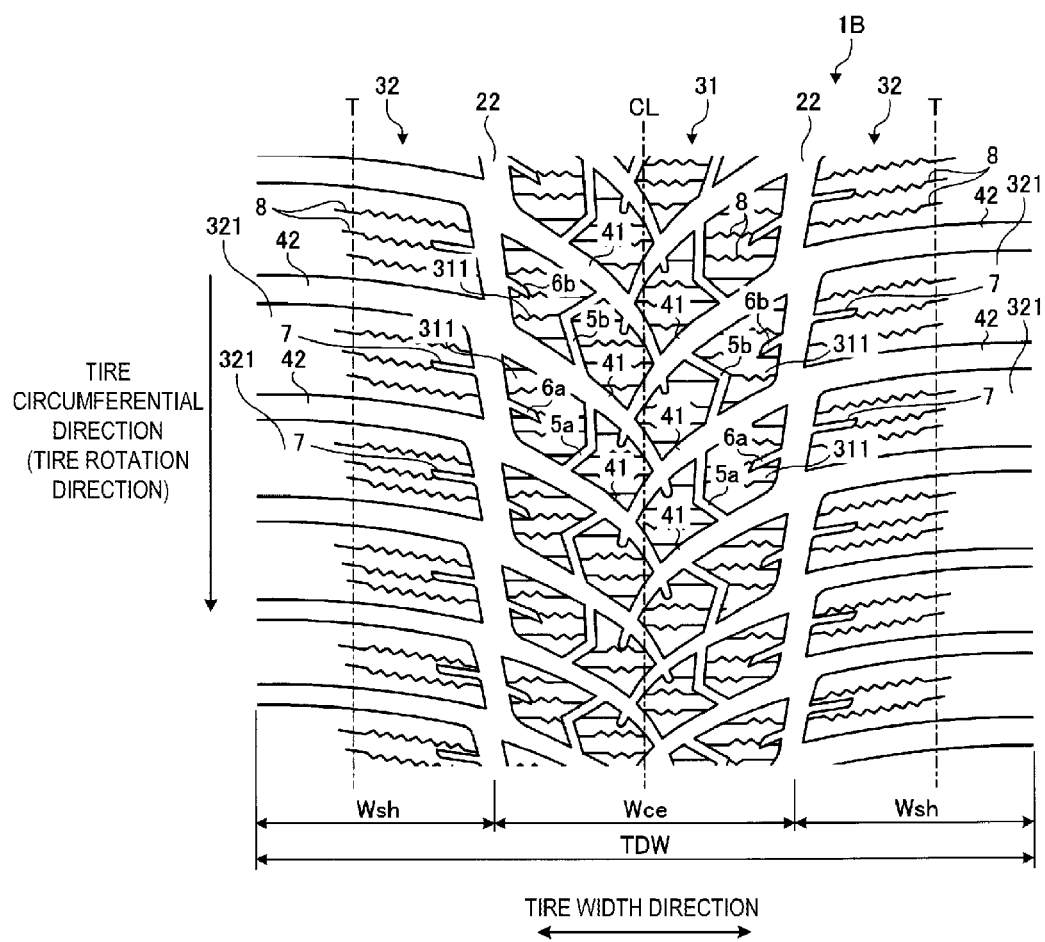
FIG. 4 is an explanatory view illustrating a modified example of the pneumatic tire depicted in FIG. 1.
Figure 5:
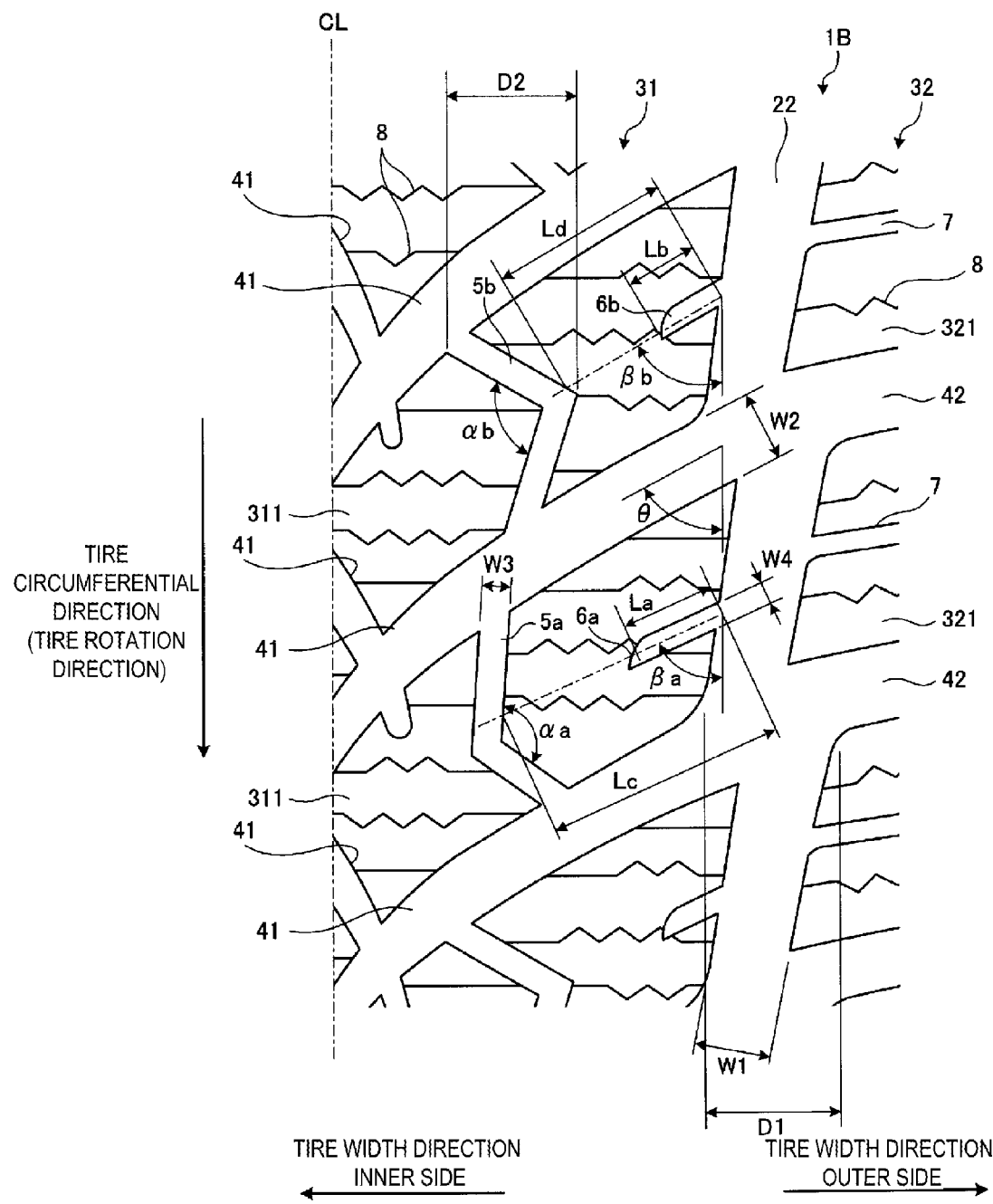
FIG. 5 is an enlarged view illustrating the main portion of the pneumatic tire depicted in FIG. 4.

FIG. 4 is an explanatory view of a modified example of the pneumatic tire 1A depicted in FIG. 1. This drawing illustrates a winter tire for use on passenger cars that has a directional tread pattern. Also, FIG. 5 is an enlarged view illustrating the main portion of a pneumatic tire 1B depicted in FIG. 4. This drawing illustrates a row of blocks on one side of the center land portion 31. In these drawings, constituent elements that are the same as those described for the tread pattern of the pneumatic tire 1A depicted in FIG. 1 (see FIG. 2) are assigned the same reference numerals and descriptions thereof are omitted.

In the configuration in FIG. 4, the pneumatic tire 1B includes two circumferential main grooves 22, 22 having a zigzag shape, one row of the center land portion 31 partitioned by the circumferential main grooves 22, 22 and a pair of left and right shoulder land portions 32, 32. Therefore, compared with the configuration in FIG. 2, a single wide center land portion 31 is partitioned.

Also, a plurality of lug grooves 41, 42 is provided in the center land portion 31 and the left and right shoulder land portions 32, 32, respectively of the pneumatic tire 1B. Herein, in the center land portion 31, the lug groove 41 is an inclined lug groove that extends at an inclination at a predetermined angle of inclination θ with respect to the tire circumferential direction, a first end portion thereof opens into the circumferential main groove 22, and a second end portion thereof extends beyond the tire equatorial plane CL and terminates within the center land portion 31.

Also, the lug grooves 41 that open into one of the circumferential main grooves 22 and the lug grooves 41 that open into the other of the circumferential main grooves 22 are disposed at predetermined intervals in the tire circumferential direction and alternately left and right. Also, two lug grooves 41, 41 that extend from one of the circumferential main grooves 22 toward the tire equatorial plane CL, and one lug groove 41 that extends from the other of the circumferential main grooves 22 toward the tire equatorial plane CL intersect within the center land portion 31. In this way, the center land portion 31 is divided by the lug grooves 41 into a mesh-like form, and a row of blocks is partitioned that includes a plurality of the blocks 311 arranged in a staggered manner in the tire circumferential direction.

In this pneumatic tire 1B, the lug grooves 41, 41 of the center land portion 31 extend at an inclination at the predetermined angle of inclination θ from the left and right circumferential main grooves 22, 22 beyond the tire equatorial plane CL and intersect. Thereby, the drainage properties of the center land portion 31 are improved, and the tire wet performance is improved. Also, the edge component of the center land portion 31 is increased, so the snow performance of the tire is improved.

In the configuration in FIG. 4 and FIG. 5, as described above, by intersecting the two lug grooves 41 that extend from one of the circumferential main grooves 22 and the lug groove 41 that extends from the other of the circumferential main grooves 22, one block 311 is partitioned.

However, this is not a limitation, and one block 311 may be partitioned by intersecting one lug groove 41 that extends from one of the circumferential main grooves 22 and one lug groove 41 that extends from the other of the circumferential main grooves 22 (not illustrated on the drawings). In this configuration, the center land portion 31 is divided in the tire circumferential direction by the lug grooves 41, so a row of blocks formed from the plurality of blocks 311 is partitioned.

Also, in the configuration in FIG. 4 and FIG. 5, the groove width W2 of the lug groove 41 increases from the tire equatorial plane CL toward the outer side in the tire width direction. Also, the angle of inclination θ of the lug groove 41 increases from the tire equatorial plane CL toward the outer side in the tire width direction. Also, the angle of inclination θ of the lug groove 41 is within the range 20 degrees $\leq \theta \leq 80$ degrees. As a result, the drainage properties of the lug groove 41 are improved.

Also, in the configuration in FIG. 4 and FIG. 5, each of the blocks 311, 321 of the center land portion 31 and the shoulder land portions 32 has a plurality of sipes 8. As a result, the edge component of the blocks 311, 321 is increased, so the tire snow performance is increased. "Sipe" refers to a cut formed in a land portion, typically with a sipe width of less than 1.5 mm (not illustrated on the drawings).

Also, in the configuration in FIG. 4 and FIG. 5, the blocks 311 in the center land portion 31 each have the bent grooves 5a, 5b. Also, each of the blocks 311 having the bent grooves 5a, 5b has the notch grooves 6a, 6b.

Also, in the configuration in FIG. 4 and FIG. 5, preferably the amplitude D1 of the zigzag shape of the circumferential main groove 22 and the amplitude D2 in the tire width direction of the bent grooves 5a, 5b have the relationship D1≤D2. These amplitudes D1, D2 are measured using the maximum width positions of the range of extension of the groove in the tire width direction as standard.

Also, in the configuration in FIG. 4 and FIG. 5, the notch grooves 6a, 6b are inclined with respect to the tire circumferential direction following the inclination of the lug grooves 41. In this case, preferably the inclination angles βa, βb with respect to the tire circumferential direction of the notch grooves 6a, 6b are within the range 60 degrees≤βa≤120 degrees and 60 degrees≤βb≤120 degrees. As a result, the edge component with respect to the tire circumferential direction of the notch grooves 6a, 6b is ensured, and the tire snow performance is ensured.

Also, in the configuration in FIG. 4, preferably the developed tread width TDW and the distance Wce between the left and right outermost circumferential main grooves 22, 22 are within the range 0.4≤Wce/TDW≤0.8. In the configuration in FIG. 4, as described above, the left and right outermost circumferential main grooves 22, 22 are disposed with left-right symmetry about the tire equatorial plane CL as center, so the distances Wsh, Wsh on the left and right from the outermost circumferential main grooves 22, 22 to the end of the tread are equal.

Also, in the configuration in FIG. 2 and FIG. 3, the bent portions of the bent grooves 5a, 5b of the blocks 311, 311 that are adjacent in the tire width direction are disposed at the same position relative to each other with respect to the tire circumferential direction. Also, the bent shape of the bent grooves 5a, 5b of the blocks 311, 311 that are adjacent in the tire width direction are disposed such that the bend directions with respect to the tire width direction are reversed with respect to each other.

In contrast, in the configuration of FIG. 4, in the center land portion 31, the plurality of blocks 311 is disposed in a staggered manner in the tire circumferential direction, so the bent portions of the bent grooves 5a, 5b of the blocks 311, 311 that are adjacent in the tire width direction are disposed in positions offset from each other in the tire circumferential direction. Also, the bent shapes of the bent grooves 5a, 5b of the blocks 311, 311 that are adjacent to each other in the tire width direction are disposed with their phases offset with respect to each other.

Effect

As described above, the pneumatic tire 1A includes the plurality of circumferential main grooves 21, 22 extending in the tire circumferential direction, the plurality of lug grooves 41 extending in the tire width direction, and the plurality of blocks 311 partitioned by the circumferential main grooves 21, 22 and the lug grooves 41 (see FIGS. 2 and 3). Also, the block 311 has a bent groove 5a (5b) having a bent shape that is convex in one direction that extends in the tire circumferential direction dividing the block 311 into two in the tire width direction. Also, the blocks 311, 311 that are adjacent to each other in the tire circumferential direction are disposed such that the bend directions of the bent grooves 5a, 5b are alternately reversed.

In this configuration, the blocks 311 are provided with the bent grooves 5a, 5b that are convex in the tire width direction, so the edge component of the blocks 311 is increased, and this has the advantage that the snow performance of the tire is improved. Also, the groove area of the land portions 31 is increased by the bent grooves 5a, 5b, and, the drainage properties of the land portions 31 are improved by extending the bent grooves 5a, 5b in the tire circumferential direction, and this has the advantage that the tire wet performance is improved. Also, the blocks 311, 311 that are adjacent to each other in the tire circumferential direction are disposed such that the bend directions of the bent grooves 5a, 5b are alternately reversed, so collapse of the blocks 311 in the tire width direction is suppressed, and this has the advantage that the steering stability performance of the tire is ensured.

Also, in the pneumatic tires 1A, 1B, the blocks 311 having the bent groove 5a (5b) have the notch grooves 6a (6b) that at a first end portion thereof open into the edge portion in the tire width direction of the blocks 311 and at a second end portion thereof terminate within the blocks 311 without intersecting the bent groove 5a (5b) (see FIGS. 2 to 5). In this configuration, by providing the notch grooves 6a, 6b in the blocks 311, the edge component of the blocks 311 is increased, which has the advantage that the tire snow performance is improved. Also, because the notch grooves 6a, 6b and the bent grooves 5a, 5b do not intersect, the stiffness of the blocks 311 is properly ensured, which has the advantage that the tire steering stability performance is ensured.

Also, in the pneumatic tires 1A, 1B, the plurality of bent grooves 5a, 5b are provided in the blocks 311 that are adjacent in the tire width direction (see FIG. 4). Thereby, the edge component of the center land portion 31 is increased, which has the advantage that the snow performance of the tire is improved.

Also, in the pneumatic tires 1A, 1B, the bent shapes of the bent grooves 5a, 5b of the blocks 311, 311 that are adjacent to each other in the tire width direction are disposed with their phases offset with respect to each other (see FIG. 4). Thereby, the stiffness of the land portions 31 in the entire periphery of the tire is made uniform, which has the advantage that the tire wet performance is improved.

Also, in the pneumatic tires 1A, 1B, the groove length Lb of the notch groove 6b on the bend side of the bent groove 5b, and the groove length La of the notch groove 6a on the opposite side to the bend side of the bent groove 5a have the relationship La>Lb (see FIG. 3 and FIG. 5). In this configuration, the groove lengths La, Lb of the notch grooves 6a, 6b are adjusted in accordance with the positional relationship with the bent grooves 5a, 5b, so the stiffness of the blocks 311 is properly ensured, which has the advantage that the steering stability performance of the tire is ensured.

Also, in the pneumatic tires 1A, 1B, the notch groove 6a (6b) is disposed on the edge portion on the outer side in the tire width direction of the blocks 311 having the bent groove 5a (5b) (see FIGS. 2 to 5). In this configuration, by opening the notch grooves 6a, 6b into the edge portions on the outer side in the tire width direction of the blocks 311, the drainage properties of the land portions 31 are improved, which has the advantage that the tire wet performance is improved.

Also, in the pneumatic tires 1A, 1B, the groove width W1 of the circumferential main groove 22 and the groove width W3 of the bent grooves 5a, 5b have the relationship 0.2≤W3/W1≤0.8 (see FIG. 3 and FIG. 5). Thereby, the groove width W3 of the bent grooves 5a, 5b is made appropriate, which has the advantage that the tire wet performance is improved. In other words, by making 0.2≤W3/W1, the drainage properties of the bent grooves 5a, 5b are properly ensured. Also, by making W3/W1≤0.8, the stiffness of the land portion 31 is properly ensured.

Also, in the pneumatic tires 1A, 1B, the groove depth H1 of the circumferential main groove 22 and the groove depth H3 of the bent grooves 5a, 5b have the relationship 0.3≤H3/H1≤0.8. Thereby, the groove depth H3 of the bent grooves 5a, 5b is made appropriate, which has the advantage that the tire wet performance is improved. In other words, by making 0.3≤H3/H1, the drainage properties of the bent grooves 5a, 5b are properly ensured. Also, by making H3/H1≤0.8, the stiffness of the land portion 31 is properly ensured.

Also, in the pneumatic tires 1A, 1B, the bend angle α (αa, αb) of the bent grooves 5a, 5b is within the range 90 degrees≤α≤150 degrees (see FIG. 3 and FIG. 5). Thereby, the bend angles α of the bent grooves 5a, 5b are made appropriate, which has the advantage that the snow performance of the tire is improved. In other words, by making 90 degrees≤α, the stiffness of the land portion 31 is properly ensured. Also by making α≤150 degrees, the edge component of the bent grooves 5a, 5b is increased, so the snow performance is increased.

Also, in the pneumatic tires 1A, 1B, the groove width W1 of the circumferential main groove 22 and the groove width W4 of the notch grooves 6a, 6b have the relationship 0.2≤W4/W1≤0.8 (see FIG. 3 and FIG. 5). Thereby, the groove width W4 of the notch grooves 6a, 6b is made appropriate, which has the advantage that the tire wet performance is improved. In other words, by making 0.2≤W4/W1, the drainage properties of the notch grooves 6a, 6b are properly ensured. Also, by making W4/W1≤0.8, the stiffness of the land portion 31 is properly ensured.

Also, in the pneumatic tires 1A, 1B, the groove depth H1 of the circumferential main groove 22 and the groove depth H4 of the notch grooves 6a, 6b have the relationship 0.1≤H4/H1≤0.6. Thereby, the groove depth H4 of the notch grooves 6a, 6b is made appropriate, which has the advantage that the tire wet performance is improved. In other words, by making 0.1≤H4/H1, the drainage properties of the notch grooves 6a, 6b are properly ensured. Also, by making H4/H1≤0.6, the stiffness of the land portion 31 is properly ensured.

Also, in the pneumatic tires 1A, 1B, the bent portion of the bent grooves 5a, 5b are disposed in the center region when the block 311 is divided into three equal portions in the tire circumferential direction (see FIG. 3 and FIG. 5). In this configuration, the bent portion of the bent grooves 5a, 5b is disposed in the center portion of the blocks 311, which has the advantage that the uneven wear resistance of the blocks 311 is properly ensured.

Also, in the pneumatic tires 1A, 1B, the notch grooves 6a, 6b are disposed in the center region when the block 311 is divided into three equal portions in the tire circumferential direction (see FIG. 3 and FIG. 5). In this configuration, the notch grooves 6a, 6b are disposed in the center portion of the blocks 311, which has the advantage that the uneven wear resistance of the blocks 311 is properly ensured.

Also, in the pneumatic tires 1A, 1B, in a pair of blocks 311, 311 that are adjacent to each other in the tire circumferential direction, the distance Lc between the point of intersection of the bent groove 5a and an imaginary line extended from the notch groove 6a having the groove length La in one of the blocks 311 and the opening of the notch groove 6a in the edge portion of the block 311 is within the range 0.2≤La/Lc≤0.6 (see FIG. 3 and FIG. 5). Also, the distance Ld between the point of intersection of the bent groove 5b and an imaginary line extended from the notch groove 6b having the groove length Lb in the other of the blocks 311 and the opening of the notch groove 6b in the edge portion of the block 311 is within the range 0.2≤Lb/Ld≤0.6. Also, the ratio La/Lc and the ratio Lb/Ld have the relationship 0.90≤(La/Lc)/(Lb/Ld)≤1.10. Thereby, the positional relationship between the bent grooves 5a, 5b and the notch grooves 6a, 6b is made appropriate, which has the advantage that the uneven wear resistance performance of the tire is improved.

Also, in the pneumatic tires 1A, 1B, in a pair of blocks 311, 311 that are adjacent to each other in the tire circumferential direction, the bend angles αa, αb of the bent grooves 5a, 5b are within the range 10 degrees≤|αa−αb|≤30 degrees. Thereby, the bend angles αa, αb of the bent grooves 5a, 5b of adjacent blocks 311, 311 are made appropriate, which has the advantage that the steering stability performance of the tire is improved. In other words, by making 10 degrees≤|αa−αb|, the mutual support action of the portions of the blocks 311, 311 divided by the bent grooves 5a, 5b is ensured. Also, by making |αa−αb|≤30 degrees, the stiffness balance of each of the blocks 311 is made uniform.

Also, in the pneumatic tires 1A, 1B, the inclination angles βa, βb with respect to the tire circumferential direction of the notch grooves 6a, 6b in a pair of blocks 311, 311 that are adjacent to each other in the tire circumferential direction are within the range |βa−βb|≤10 degrees (see FIG. 3 and FIG. 5). In this configuration, the notch grooves 6a, 6b of adjacent blocks 311, 311 are disposed substantially parallel. This has the advantage that the uneven wear resistance performance of the tire is improved.

Also, in the pneumatic tires 1A, 1B, the opening of the bent groove 5a (5b) is disposed offset with respect to the opening of the bent groove 5b (5a) of at least one of the blocks 311 that are adjacent in the tire circumferential direction (see FIG. 3 and FIG. 5). Thereby, the edge effect of the land portion 31 is increased, which has the advantage that the snow performance of the tire is improved.

Also, the pneumatic tire 1B includes two circumferential main grooves 22, 22 extending in the tire circumferential direction, and one row of the center land portion 31 and the pair of left and right shoulder land portions 32, 32 partitioned by the circumferential main grooves 22, 22, and the plurality of lug grooves 41 disposed in the center land portion 31 (see FIG. 4). Also, the lug groove 41 of the center land portion 31 is an inclined lug groove that extends at an inclination at a predetermined angle of inclination θ with respect to the tire circumferential direction, a first end portion thereof opens into the circumferential main groove 22, and a second end portion thereof terminates within the center land portion 31. Also, the center land portion 31 is divided into a plurality of blocks 311 by intersecting within the center land portion 31 a lug groove 41 that extends from one of the circumferential main grooves 22 and a lug groove 41 that extends from the other of the circumferential main grooves 22. Also, the block 311 has a bent groove 5a (5b) having a bent shape that is convex in one direction that extends in the tire circumferential direction dividing the block 311 into two in the tire width direction. Also, the blocks 311, 311 that are adjacent to each other in the tire circumferential direction are disposed such that the bend directions of the bent grooves 5a, 5b are alternately reversed.

In this configuration, the lug grooves 41, 41 of the center land portions 31 extend at an inclination at the predetermined angle of inclination θ from the left and right circumferential main grooves 22, 22 beyond the tire equatorial plane CL, and intersect. Thereby, the drainage properties of the center land portion 31 are improved, and this has the advantage that the tire wet performance is improved. Also, the edge component of the center land portion 31 is increased, which has the advantage that the snow performance of the tire is improved.

In this configuration, the blocks 311 are provided with the bent grooves 5a, 5b that are convex in the tire width direction, so the edge component of the blocks 311 is increased, and this has the advantage that the snow performance of the tire is improved. Also, the groove area of the land portions 31 is increased by the bent grooves 5a, 5b, and, the drainage properties of the land portions 31 are improved by extending the bent grooves 5a, 5b in the tire circumferential direction, and this has the advantage that the tire wet performance is further improved. Also, the blocks 311, 311 that are adjacent to each other in the tire circumferential direction are disposed such that the bend directions of the bent grooves 5a, 5b are alternately reversed, so collapse of the blocks 311 in the tire width direction is suppressed, and this has the advantage that the steering stability performance of the tire is ensured.

Also, in the pneumatic tire 1B, the circumferential main grooves 22 have a zigzag shape (see FIG. 4). Thereby, the edge component of the land portions 31, 32 is increased, which has the advantage that the snow performance of the tire is improved.

Also, in the pneumatic tire 1B, the amplitude D1 of the zigzag shape of the circumferential main groove 22 and the amplitude D2 in the tire width direction of the bent grooves 5a, 5b have the relationship D1<D2 (see FIG. 5). This has the advantage that both the water drainage properties of the tire and the edge effect due to the circumferential main grooves 22 and the bent grooves 5a, 5b are achieved.

Also, in the pneumatic tire 1B, the groove width W2 of the lug grooves 41 increases from the tire equatorial plane CL toward the outer side in the tire width direction (see FIG. 5). Thereby, the water drainage performance of the lug grooves 41 is improved, which has the advantage that the tire wet performance is improved.

Also, in the pneumatic tire 1B, the angle of inclination θ of the lug grooves 41 increases from the tire equatorial plane CL toward the outer side in the tire width direction (see FIG. 5). Thereby, the water drainage performance of the lug grooves 41 in the region close to the tire equatorial plane CL is improved, which has the advantage that the wet performance of the tire is improved. Also, the edge component of the lug grooves 41 in the region on the outer side in the tire width direction is increased, which has the advantage that the tire snow performance is improved.

Examples

FIGS. 6A-6B include a table showing results of performance testing of pneumatic tires according to embodiments of the present technology.

In the performance tests, a plurality of mutually differing pneumatic tires was evaluated for (1) snow performance, (2) wet performance, and (3) steering stability performance (see FIGS. 6A-6B). In the performance tests, pneumatic tires with a tire size of 205/55R16 91H were assembled on a rim having a rim size of 16×6.5JJ, and an air pressure of 230 kPa and the maximum load defined by JATMA were applied to these pneumatic tires. Also, the pneumatic tires were fitted to a 1600 cc displacement front-engine front-drive (FF) test vehicle.

(1) Evaluation of performance on snow: The test vehicle was driven on a snowy road surface of a snowy road test site, and the braking distance from a traveling speed of 40 km/h was measured. Based on the measurement results, an index evaluation was carried out using a Comparative Example as standard (100). In these evaluations, higher scores were preferable.

(2) Evaluation of wet performance: The test vehicle on which the pneumatic tires were mounted was driven on a wet road surface, and braking distances were measured from an initial speed of 100 km/h. Based on the measurement results, an index evaluation was carried out using a Comparative Example as standard (100). In the evaluation results, higher scores were preferable (3) Evaluation of steering stability performance: The test vehicle on which the pneumatic tires were mounted was driven at a speed of from 60 km/h to 100 km/h on a flat circuit test course. Then, the test driver performed a sensory evaluation regarding steering while lane changing and cornering and stability while traveling forward. Results of the evaluations were indexed and the index value of the pneumatic tire of Comparative Example was set as the standard score (100). Higher scores were preferable. Also, if the evaluation was 97 or higher, it was deemed that the tire steering stability was properly ensured.

Working Examples 1 to 16 were pneumatic tires having tread patterns as depicted in FIGS. 4 and 5. Also, the groove width W1 of the circumferential main grooves 22 was W1=7.0 mm, and the groove depth H1 was H1=9.0 mm. Also, the groove width W2 of the lug grooves 41 of the center land portion 31 was W2=7.4 mm at the opening of the circumferential main groove 22, and 3.0 mm at the tire equatorial plane CL. Also, the groove depth H2 of the lug grooves 41 of the center land portions 31 was H2=9.0 mm. Also, the angle of inclination θ of the lug grooves 41 of the center land portion 31 was θ=55 degrees at the opening to the circumferential main grooves 22, and θ=20 degrees at the tire equatorial plane CL. Also, the developed tread width TDW was TDW=170 mm, and the distance Wce between the left and right circumferential main grooves 22, 22 was Wce=80 mm.

The pneumatic tire of Comparative Example did not have the bent grooves 5a, 5b and the notch grooves 6a, 6b in the tread patterns depicted in FIGS. 4 and 5.

As can be seen from the test results, with the pneumatic tires of Working Examples 1 to 16, the snow performance and the wet performance of the tire were improved, and the tire steering stability performance was properly ensured.

What is claimed is:

1. A pneumatic tire, comprising: a plurality of circumferential main grooves that extend in a tire circumferential direction; a plurality of lug grooves that extend in a tire width direction and connect adjacent of the circumferential main grooves, the plurality of lug grooves having a straight shape or an arc shape; and a plurality of blocks partitioned by the circumferential main grooves and a pair of the lug grooves adjacent in the tire circumferential direction, the plurality of blocks including a notch groove interposing the lug grooves adjacent in the tire circumferential direction, two block rows composed of the plurality of blocks being formed between a pair of outermost circumferential main grooves of the circumferential main grooves, the blocks including a bent groove having a bent shape that is convex in one direction and that extends in the tire circumferential direction dividing the block into two in the tire width direction, and, the blocks that are adjacent to each other in the tire circumferential direction being disposed such that a bend direction of the bent groove is alternately reversed, wherein a bend angle α of the bent groove is within a range 100 degrees≤α≤150 degrees and the notch groove does not open into the bent groove; wherein the blocks are divided into first and second block portions by the bent groove, the first block portion on a tire ground contact edge side has the notch groove at an edge portion on the tire ground contact edge side, and the second block portion on a tire equatorial plane side does not have the notch groove at an edge portion on the tire equatorial plane side.

2. The tire according to claim 1, wherein the blocks that have the bent groove include the notch groove in which a first end portion thereof opens into an edge portion in the tire width direction of the block, and a second end portion thereof terminates within the block without intersecting the bent groove.

3. The pneumatic tire according to claim 2, wherein a groove length Lb of the notch groove on a convex side of the bent groove and a groove length La of the notch groove on a concave side of the bent groove have a relationship La>Lb.

4. The pneumatic tire according to claim 2, wherein the notch groove disposed on the edge portion on an outer side in the tire width direction of the blocks having the bent groove.

5. The pneumatic tire according to claim 2, wherein a groove width W1 of the circumferential main grooves and a groove width W4 of the notch groove have a relationship $0.2 \leq W4/W1 \leq 0.8$.

6. The pneumatic tire according to claim 2, wherein a groove depth H1 of the circumferential main grooves and a groove depth H4 of the notch groove have a relationship $0.1 \leq H4/H1 \leq 0.6$.

7. The pneumatic tire according to claim 2, wherein in a pair of blocks that are adjacent to each other in the tire circumferential direction,
a distance Lc between a point of intersection of the bent groove and an imaginary line extended from the notch groove having a groove length La in one of the blocks and the opening of the notch groove in the edge portion of the block is within a range $0.2 \leq La/Lc \leq 0.6$,
a distance Ld between a point of intersection of the bent groove and an imaginary line extended from the notch groove having a groove length Lb in the other of the blocks and the opening of the notch groove in the edge portion of the block is within a range $0.2 \leq Lb/Ld \leq 0.6$, and
a ratio La/Lc and a ratio Lb/Ld have a relationship $0.9 \leq (La/Lc)/(Lb/Ld) \leq 1.10$.

8. The tire according to claim 1, wherein blocks that are adjacent to each other in the tire width direction have a plurality of bent grooves.

9. The pneumatic tire according to claim 1, wherein the bent shape of the bent groove of the blocks that are adjacent to each other in the tire width direction is disposed so that phases are offset with respect to each other.

10. The pneumatic tire according to claim 1, wherein a groove width W1 of the circumferential main grooves and a groove width W3 of the bent groove have a relationship $0.2 \leq W3/W1 \leq 0.8$.

11. The pneumatic tire according to claim 1, wherein a groove depth H1 of the circumferential main grooves and a groove depth H3 of the bent groove have a relationship $0.3 \leq H3/H1 \leq 0.8$.

12. The pneumatic tire according to claim 1, wherein a bent portion of the bent groove is disposed in a center region when the block is divided into three equal portions in the tire circumferential direction.

13. The pneumatic tire according to claim 1, wherein the notch groove is disposed in a center region when the block is divided into three equal portions in the tire circumferential direction.

14. The pneumatic tire according to claim 1, wherein in a pair of blocks that are adjacent to each other in the tire circumferential direction, the bend angles $\alpha a$, $\alpha b$ of the bent groove are within a range 10 degrees$\leq |\alpha a - \alpha b| \leq$30 degrees.

15. The pneumatic tire according to claim 1, wherein in a pair of blocks that are adjacent to each other in the tire circumferential direction, inclination angles $\beta a$, $\beta b$ of the notch groove with respect to the tire circumferential direction are within a range $|\beta a - \beta b| \leq 10$ degrees.

16. The pneumatic tire according to claim 1, wherein an opening of the bent groove is disposed offset with respect to an opening of at least one adjacent bent groove in the tire circumferential direction.

17. The pneumatic tire according to claim 1, wherein the circumferential main grooves have a zigzag shape.

18. The pneumatic tire according to claim 17, wherein an amplitude D1 of the zigzag shape of the circumferential main grooves and an amplitude D2 in the tire width direction of the bent groove have a relationship D1<D2.

19. The pneumatic tire according to claim 1, wherein a groove width W2 of the lug groove increases from a tire equatorial plane toward an outer side in the tire width direction.

20. The pneumatic tire according to claim 1, wherein an inclination angle of the lug grooves increases from a tire equatorial plane toward an outer side in the tire width direction.

21. The pneumatic tire according to claim 1, wherein the bend angle $\alpha$ of the bent groove is within a range 100 degrees$\leq \alpha \leq$130 degrees.

22. The pneumatic tire according to claim 1, wherein:
the blocks that have the bent groove include the notch groove in which a first end portion thereof opens into an edge portion in the tire width direction of the block, and a second end portion thereof terminates within the block without intersecting the bent groove; and
a groove length Lb of the notch groove on a convex side of the bent groove and a groove length La of the notch groove on a concave side of the bent groove have a relationship La>Lb.

* * * * *